US010053198B1

(12) United States Patent
Thibodeaux

(10) Patent No.: US 10,053,198 B1
(45) Date of Patent: Aug. 21, 2018

(54) CRAWFISH TRACK SYSTEM

(71) Applicant: Alcee John Thibodeaux, Crowley, LA (US)

(72) Inventor: Alcee John Thibodeaux, Crowley, LA (US)

( * ) Notice: Subject to any disclaimer, the term of this patent is extended or adjusted under 35 U.S.C. 154(b) by 78 days.

(21) Appl. No.: 15/418,714

(22) Filed: Jan. 28, 2017

(51) Int. Cl.
| | |
|---|---|
| *B62D 55/04* | (2006.01) |
| *B63H 19/08* | (2006.01) |
| *B63B 35/14* | (2006.01) |
| *B60F 3/00* | (2006.01) |
| *A01K 80/00* | (2006.01) |
| *B62D 55/084* | (2006.01) |
| *B62D 55/116* | (2006.01) |
| *B62D 55/10* | (2006.01) |

(52) U.S. Cl.
CPC ........... *B63H 19/08* (2013.01); *B60F 3/0007* (2013.01); *B63B 35/14* (2013.01); *A01K 80/00* (2013.01); *B60F 3/0015* (2013.01); *B62D 55/04* (2013.01); *B62D 55/084* (2013.01); *B62D 55/10* (2013.01); *B62D 55/116* (2013.01)

(58) Field of Classification Search
CPC .......... B60F 3/07; B60F 3/0015; B63H 19/08; B63B 35/14; A01K 80/00; B62D 55/04; B62D 55/10; B62D 55/116; B62D 55/084
See application file for complete search history.

(56) References Cited

U.S. PATENT DOCUMENTS

| | | | | | |
|---|---|---|---|---|---|
| 4,817,553 | A | * | 4/1989 | Knott, Sr. | ............... B63B 35/00 114/255 |
| 4,872,413 | A | * | 10/1989 | Hebert | ................... A01K 80/00 114/255 |
| D417,897 | S | * | 12/1999 | Miller | ......................... D12/306 |
| 7,329,161 | B2 | * | 2/2008 | Roering | .................. B60F 3/003 280/43.17 |
| 8,808,042 | B1 | * | 8/2014 | Hewitt | .................. B60F 3/0015 440/12.51 |
| 2005/0003715 | A1 | * | 1/2005 | Hewitt | .................. B60F 3/0015 440/12.5 |
| 2014/0113512 | A1 | * | 4/2014 | Dick | ....................... B63B 25/28 440/12.52 |
| 2017/0280640 | A1 | * | 10/2017 | Hansen | ................ A01G 25/092 |

* cited by examiner

*Primary Examiner* — Tony H Winner
*Assistant Examiner* — Marlon A Arce
(74) *Attorney, Agent, or Firm* — RG Patent Consulting, LLC; Rachel Gilboy

(57) ABSTRACT

A lug track system for crawfish boats approximately 8 feet wide and 14-feet long for the use of guiding a boat along a shallow water track system thereby replacing a steel lug wheel on an existing crawfish boat.

14 Claims, 4 Drawing Sheets

US 10,053,198 B1

CRAWFISH TRACK SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

The present invention relates generally to the field of track system devices and more specifically relates to a track system for crawfish boats approximately 8 feet wide and 14-feet long for the use of guiding a boat along a shallow water track system thereby replacing a steel lug wheel on an existing crawfish boat

2. Description of the Related Art

Every year farmers plant rice and after the rice crop they harvest crawfish in the same fields. The current system comprises a boat with a 28-inch diameter steel wheel with lugs that cuts through the hard pan of the field and leaves a ditch about 4-feet wide and about 2.5-feet deep. Unfortunately the farmers can't efficiently drain the water out of the fields in the boat runs. The farmers have to squeeze the water out of the boat runs with a levee plow then once the water is drain they can then plow the field and wait for the field to dry. The farmer then has to come back again with a earth scraper to level and pack the dirt taken only a half of scope at a time. Finally the farmer has to return again with a land level only taking half at a time to level the field which is costing hundreds of thousands of dollars to repair these fields. Various attempts have been made to solve the problems which may be found in the related art but have thus far been unsuccessful. A need exists for a reliable Crawfish Track System to avoid the above-mentioned problems.

BRIEF SUMMARY OF THE INVENTION

In view of the foregoing disadvantages inherent in the known art, the present invention provides a novel Crawfish Track System. The general purpose of the present invention, which will be described subsequently in greater detail, is to provide a track system for crawfish boats approximately 8 feet wide and 14-feet long for the use of guiding a boat along a shallow water track system thereby replacing a steel lug wheel on an existing crawfish boat. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, Crawfish Track System, constructed and operative according to the teachings of the present invention.

The various embodiments of the present invention will hereinafter be described in conjunction with the appended drawings.

DETAILED DESCRIPTION

As discussed above, embodiments of the present invention relate to a lug track system device and more particularly to a Crawfish Track System.

The Crawfish Track System comprises a lug track system 200 for crawfish boats 100 approximately 8 feet wide and 14-feet long for the use of guiding a boat along a shallow water track system thereby replacing a steel lug wheel on an existing crawfish boat. The present invention is structured and arranged to build a lug track system that replaces the wheel with a track that does not cut into the mud, while floating over without cutting a ditch in the fields.

The present invention preferably comprises a 16-inch by 146-inch by 2.5 lug track system 200. The lug track system 200 is structured and arranged having two lower skids (707 uhmw) thereby replacing existing wheels and bearing.

Figure 1:
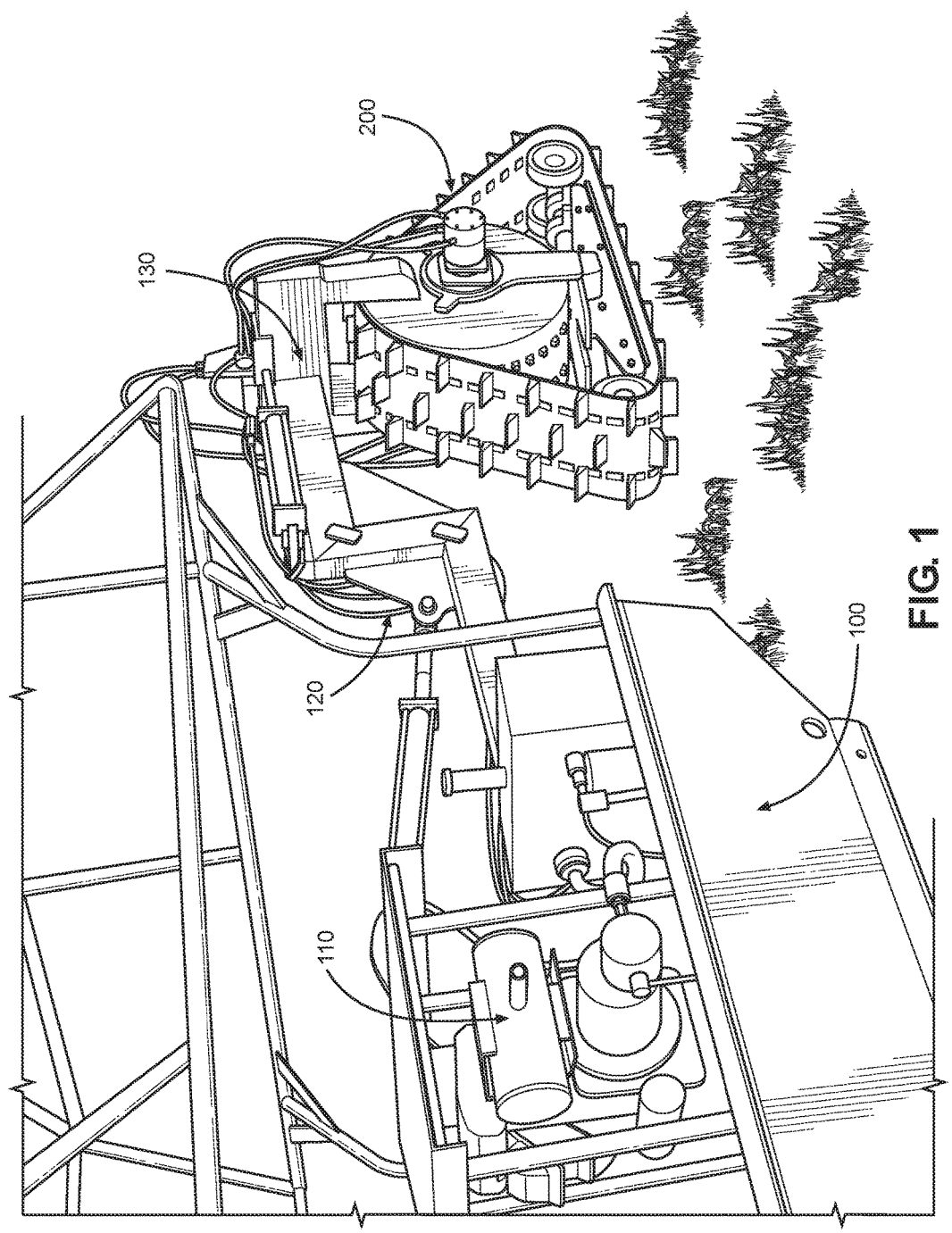
FIG. 1 illustrates a crawfish boat incorporating a lug track system according to a preferred embodiment of the present invention.

Referring to FIG. 1, the crawfishing boat 100 usually includes an engine 110 connected thereto and is adapted to provide power to the lug track system 200, a hydraulic control line bundle 120 that includes a hydraulic control line for steering the lug track system, a hydraulic control line for forward rotation of the lug track system, a hydraulic control line for reverse rotation of the lug track system, a hydraulic control line adapted to move the crawfishing boat up and down relative to the lug track system, and a control apparatus 130 for connecting the lug track system to a back end of the crawfishing boat.

Figure 2:
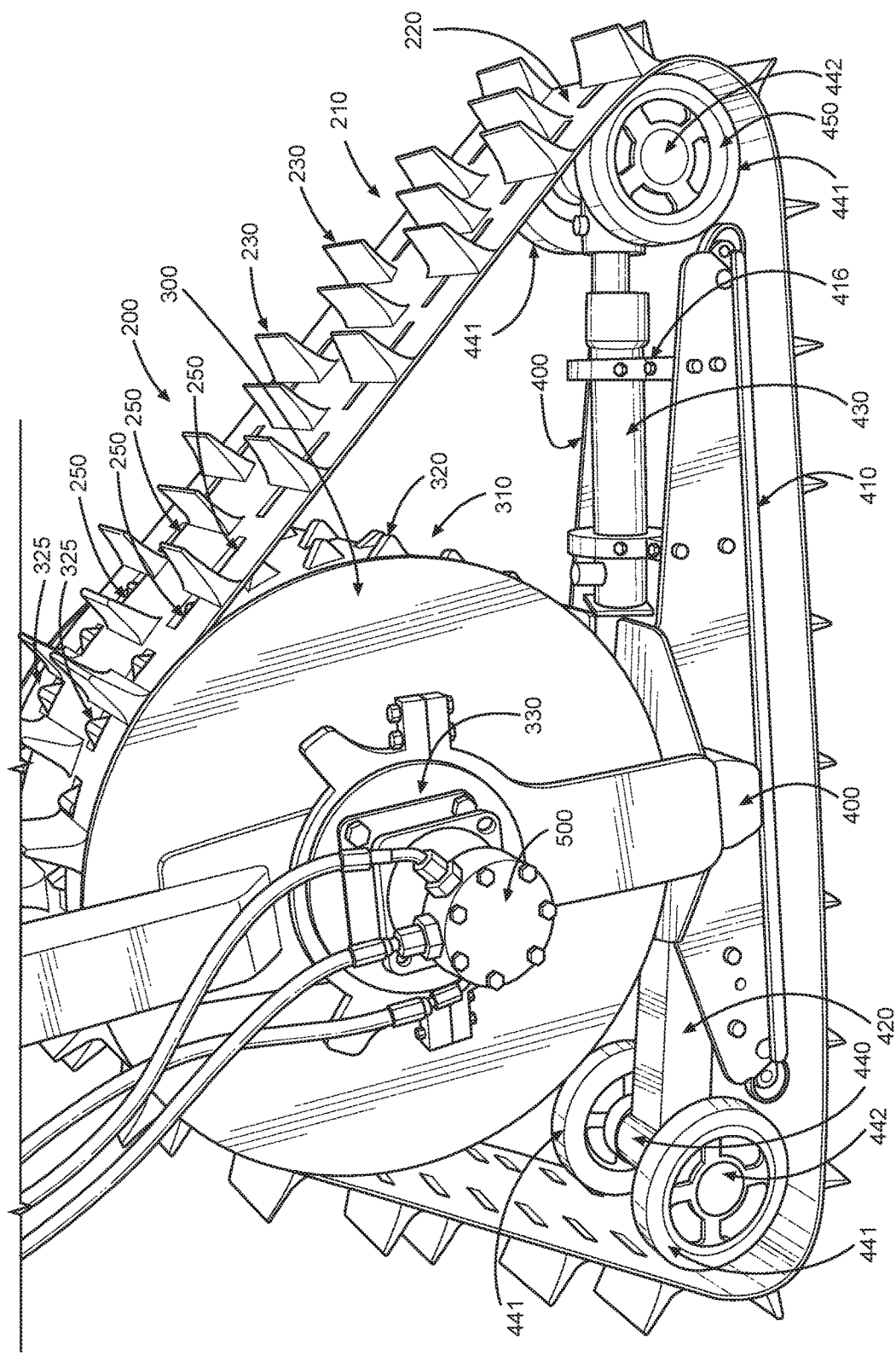
FIG. 2 illustrates a perspective view of the lug track system according to the preferred embodiment of the present invention of FIG. 1.
Figure 3:
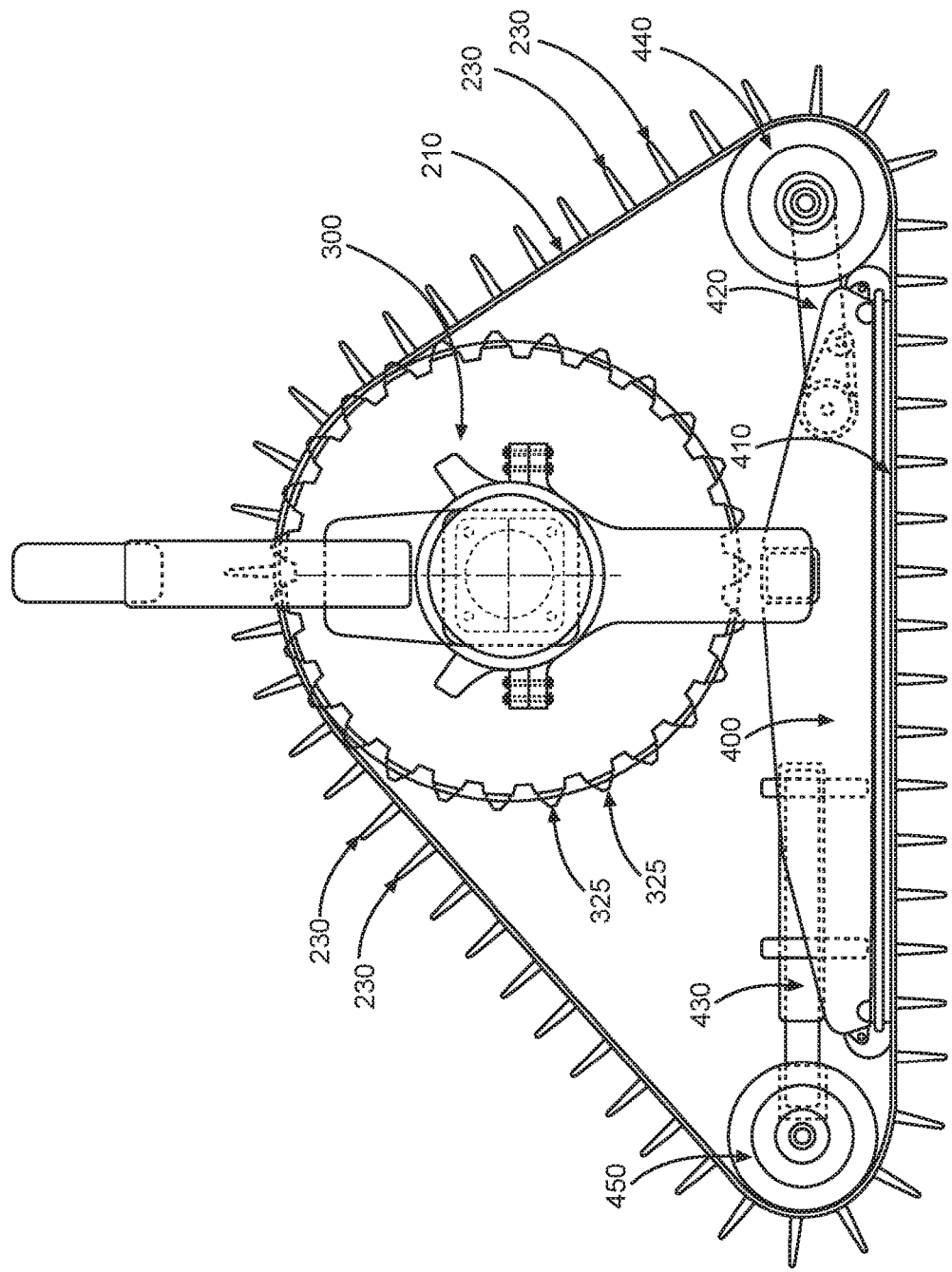
FIG. 3 illustrates a side view of the lug track system according to the preferred embodiment of the present invention of FIG. 1.
Figure 4:
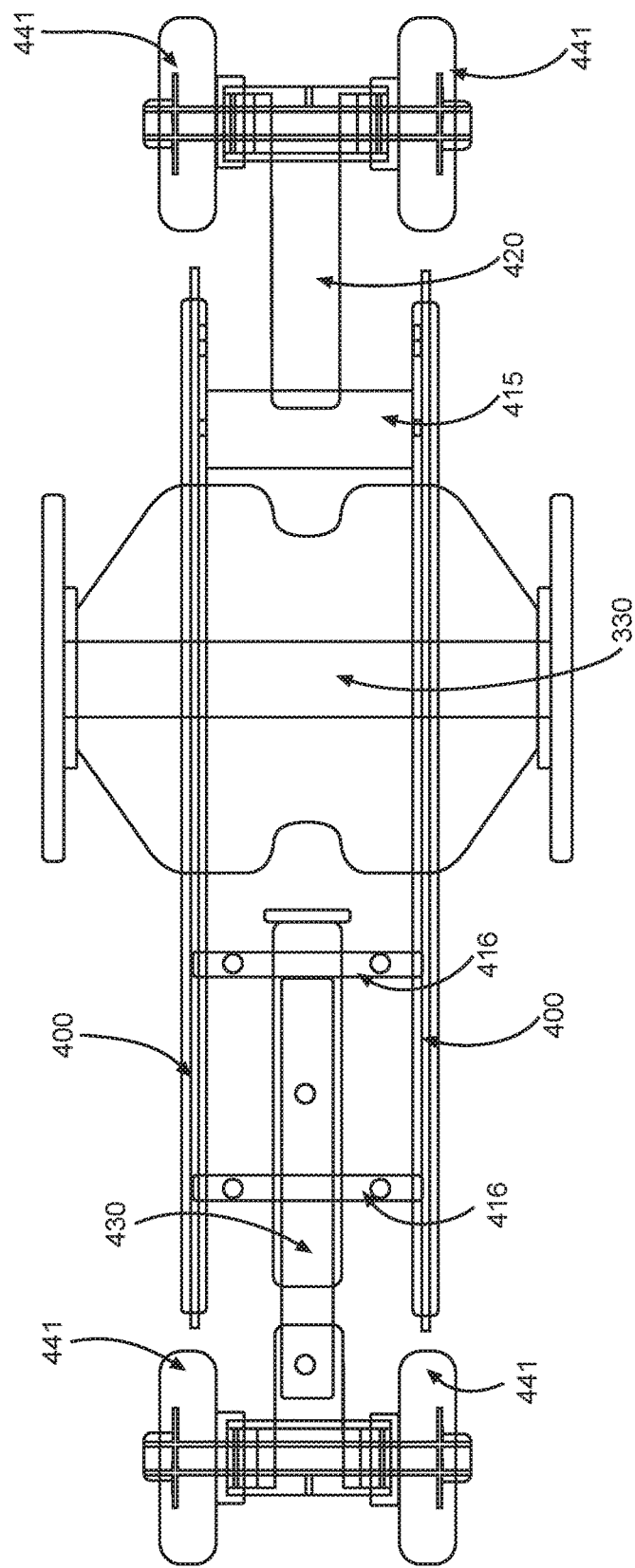
FIG. 4 illustrates a bottom view of the lug track system according to the preferred embodiment of the present invention of FIG. 1.

As shown in FIGS. 2-3, the preferred embodiment of the inventive lug track system 200 is mechanically connected to the control apparatus 130 and comprises a continuous track member 210 including a continuous band member 220, and a series of spaced tread members 230 attached to the continuous band member 220 and extending therefrom and are adapted to contact a ground surface and propel the crawfishing boat 100 with respect to the ground surface, a primary wheel member 300 including a cylindrical body portion 310 having an outer surface 320 adapted to contact and maintain a frictional connection with an inner surface of the continuous track member, and a central axle member 330 connected to the cylindrical body portion, wherein the primary wheel member is mechanically connected to the hydraulic control line for forward rotation of the primary wheel, and mechanically connected to the hydraulic control line for reverse rotation of the primary wheel member 300, two contact skid members 400 connected to opposite ends of the central axle member of the primary wheel member and extend downwardly therefrom, a skid plate member 410 connected to bottom edges of the two contact skid members 400 and is adapted to contact the inner surface of the at least one continuous track member to thereby create a supporting surface between an outer surface of the at least one continuous track member and a ground surface the crawfishing boat is traveling upon, a front portion skid connector 415 extending between and connecting the two contact skid members 400 at front portions thereof, a back portion skid connector 416 extending between and connecting the two contact skid members 400 at back portions thereof, an elongated front portion secondary wheel connector 420 pivotally connected to the front portion skid connector 415 and extending outwardly therefrom towards the inner surface of said at least one continuous track member 210, an elongated back portion secondary wheel connector 430 fixedly connected to the back portion skid connector 416 and extending outwardly therefrom towards the inner surface of the at least one continuous track member 210; and wherein the elongated back portion secondary wheel connector 430 is formed as a biasing piston member, a front portion secondary wheel member 440 rotatably connected to the elongated front portion secondary wheel connector 420 and is adapted to contact the inner surface of the at least one continuous track member 210, and a back portion secondary wheel member 450 rotatably connected to the elongated back portion secondary wheel connector 430 and is adapted to contact and press against the inner surface of the at least one continuous track member 210 to thereby reduce slack in the at least one continuous track member 210, and wherein the supporting surface defines a supporting surface area that is adapted to be greater than supporting surface areas formed by lug wheels used within previously known crawfish boat propulsion systems, and as such is adapted to provide greater friction between said propulsion system and said ground surface said crawfishing boat is traveling upon than previously known crawfish boat propulsion systems.

To rotate the primary wheel member 300, at least one hydraulic motor member 500 is connected to one of the opposite ends of the central axle member 330, is mechanically connected to the hydraulic control lines, and is mechanically connected to the central axle member to thereby rotate the central axle member and propel the lug track system. The primary wheel member 300 further includes a series of spaced projection members 325 upon the outer surface of the cylindrical body portion 310, and wherein the at least one continuous track member 210 further includes a series of spaced openings 250 therein adapted to coincide with and releasably and frictionally connect with said series of spaced projection members 325 of said primary wheel member, such that when said primary wheel member rotates, said continuous track member rotates therewith.

In a preferred embodiment, the front portion secondary wheel member 440 may be formed as two spaced wheel members 441 connected to one another via an elongated axle member 442; and wherein the back portion secondary wheel member 450 is formed as two spaced wheel members 441 connected to one another via an elongated axle member 442.

In a preferred embodiment the series of spaced tread members 230 can be offset from one another, and the two contact skid members 400 and said skid plate member 410 are formed from ultra-high molecular weight polyethylene.

The embodiments of the invention described herein are exemplary and numerous modifications, variations and rearrangements can be readily envisioned to achieve substantially equivalent results, all of which are intended to be embraced within the spirit and scope of the invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claim:

1. In a propulsion system for use with a crawfishing boat that includes an engine, a primary wheel, a hydraulic control line for steering said primary wheel, a hydraulic control line for forward rotation of said primary wheel, a hydraulic control line for reverse rotation of said primary wheel, and a hydraulic control line adapted to move said crawfishing boat up and down relative to said primary wheel, the improvement comprising:
    a lug track system adapted to replace said primary wheel in said propulsion system, comprising:
        at least one continuous track member including:
            a continuous band member; and
            a series of spaced tread members; wherein said series of spaced tread members are attached to said band member and extending therefrom, and are adapted to contact a ground surface and propel said crawfishing boat with respect to said ground surface;
        a primary wheel member including:
            a cylindrical body portion having an outer surface adapted to contact and maintain a frictional connection with an inner surface of said at least one continuous track member; and
            a central axle member connected to said cylindrical body portion; wherein said primary wheel member is adapted to be mechanically connected to said hydraulic control line for forward rotation of said primary wheel, and mechanically connected to said hydraulic control line for reverse rotation of said primary wheel;
    two contact skid members;
        wherein said two contact skid members are connected to opposite ends of said central axle member of said primary wheel member and extend downwardly therefrom;
    a skid plate member;
        wherein said skid plate member is connected to bottom edges of said two contact skid members and is adapted to contact said inner surface of said at least one continuous track member to thereby create a supporting surface between an outer surface of said at least one continuous track member and a ground surface said crawfishing boat is traveling upon;
    a front portion skid connector;
        wherein said front portion skid connector extends between and connects said two contact skid members at front portions thereof;
    a back portion skid connector;
        wherein said back portion skid connector extends between and connects said two contact skid members at back portions thereof;
    an elongated front portion secondary wheel connector;
        wherein said elongated front portion secondary wheel connector is pivotally connected to said front portion skid connector and extends outwardly therefrom towards said inner surface of said at least one continuous track member;
    an elongated back portion secondary wheel connector;

wherein said elongated back portion secondary wheel connector is fixedly connected to said back portion skid connector and extends outwardly therefrom towards said inner surface of said at least one continuous track member; and wherein said elongated back portion secondary wheel connector is formed as a biasing piston member;

a front portion secondary wheel member;
  wherein said front portion secondary wheel member is rotatably connected to said elongated front portion secondary wheel connector and is adapted to contact said inner surface of said at least one continuous track member; and a back portion secondary wheel member;
  wherein said back portion secondary wheel member is rotatably connected to said elongated back portion secondary wheel connector and is adapted to contact and press against said inner surface of said at least one continuous track member to thereby reduce slack in said at least one continuous track member; and
  wherein said supporting surface defines a supporting surface area providing greater friction between said propulsion system and said ground surface said crawfishing boat is traveling upon.

2. The lug track system of claim 1, further comprising at least one hydraulic motor member connected to one of said two spaced axle connector members, is mechanically connected to said hydraulic control lines, and is mechanically connected to said central axle member to thereby rotate said central axle member and propel said lug track system.

3. The lug track system of claim 2, wherein there are two hydraulic motor members connected to respective ones of said two spaced axle connector members, such that one of said hydraulic motor members is connected to said hydraulic control line for forward rotation of said primary wheel, and one of said hydraulic motor members is connected to said hydraulic control line for reverse rotation of said primary wheel.

4. The lug track system of claim 1, wherein said series of spaced tread members are offset from one another.

5. The lug track system of claim 1, wherein said primary wheel member further includes a series of spaced projection members upon said outer surface of said cylindrical body portion; and wherein said at least one continuous track member further includes a series of spaced openings therein adapted to coincide with and releasably and frictionally connect with said series of spaced projection members of said primary wheel member, such that when said primary wheel member rotates, said continuous track member rotates therewith.

6. The lug track system of claim 1, wherein said front portion secondary wheel member is formed as two spaced wheel members connected to one another via an elongated axle member; and
  wherein said back portion secondary wheel member is formed as two spaced wheel members connected to one another via an elongated axle member.

7. The lug track system of claim 1, wherein said two contact skid members and said skid plate member are formed from ultra-high molecular weight polyethylene.

8. A combination of a crawfishing boat and a propulsion system, comprising:
  a crawfishing boat including:
    an engine connected thereto and adapted to providing power to a lug track system;
    a hydraulic control line for steering said lug track system;
    a hydraulic control line for forward rotation of said lug track system;
    a hydraulic control line for reverse rotation of said lug track system;
    a hydraulic control line adapted to move said crawfishing boat up and down relative to said lug track system; and
    a control apparatus for connecting said lug track system to a back end of said crawfishing boat; and
  a lug track system mechanically connected to said control apparatus of said crawfishing boat, and comprising:
    at least one continuous track member including:
      a continuous band member; and a series of spaced tread members;
      wherein said series of spaced tread members are attached to said band member and extending therefrom, and are adapted to contact a ground surface and propel said crawfishing boat with respect to said ground surface;
    a primary wheel member including:
      a cylindrical body portion having an outer surface adapted to contact and maintain a frictional connection with an inner surface of said at least one continuous track member; and
      a central axle member connected to said cylindrical body portion; wherein said primary wheel member is mechanically connected to said hydraulic control line for forward rotation of said primary wheel, and mechanically connected to said hydraulic control line for reverse rotation of said primary wheel;
    two contact skid members;
      wherein said two contact skid members are connected to opposite ends of said central axle member of said primary wheel member and extend downwardly therefrom;
    a skid plate member;
      wherein said skid plate member is connected to bottom edges of said two contact skid members and is adapted to contact said inner surface of said at least one continuous track member to thereby create a supporting surface between an outer surface of said at least one continuous track member and a ground surface said crawfishing boat is traveling upon;
    a front portion skid connector;
      wherein said front portion skid connector extends between and connects said two contact skid members at front portions thereof;
    a back portion skid connector;
      wherein said back portion skid connector extends between and connects said two contact skid members at back portions thereof;
    an elongated front portion secondary wheel connector;
      wherein said elongated front portion secondary wheel connector is pivotally connected to said front portion skid connector and extends outwardly therefrom towards said inner surface of said at least one continuous track member;
    an elongated back portion secondary wheel connector;
      wherein said elongated back portion secondary wheel connector is fixedly connected to said back portion skid connector and extends outwardly therefrom towards said inner surface of said at least one continuous track member; and wherein said elongated back portion secondary wheel connector is formed as a biasing piston member;
a front portion secondary wheel member;
wherein said front portion secondary wheel member is rotatably connected to said elongated front portion secondary wheel connector and is adapted to contact said inner surface of said at least one continuous track member; and
a back portion secondary wheel member;
wherein said back portion secondary wheel member is rotatably connected to said elongated back portion secondary wheel connector and is adapted to contact and press against said inner surface of said at least one continuous track member to thereby reduce slack in said at least one continuous track member; and
wherein said supporting surface defines a supporting surface area providing greater friction between said propulsion system and said ground surface said crawfishing boat is traveling upon.

9. The combination of claim 8, further comprising at least one hydraulic motor member connected to one of said two spaced axle connector members, is mechanically connected to said hydraulic control lines, and is mechanically connected to said central axle member to thereby rotate said central axle member and propel said lug track system.

10. The combination of claim 9, wherein there are two hydraulic motor members connected to respective ones of said two spaced axle connector members, such that one of said hydraulic motor members is connected to said hydraulic control line for forward rotation of said primary wheel, and one of said hydraulic motor members is connected to said hydraulic control line for reverse rotation of said primary wheel.

11. The combination of claim 8, wherein said series of spaced tread members are offset from one another.

12. The combination of claim 8, wherein said primary wheel member further includes a series of spaced projection members upon said outer surface of said cylindrical body portion; and wherein said at least one continuous track member further includes a series of spaced openings therein adapted to coincide with and releasably and frictionally connect with said series of spaced projection members of said primary wheel member, such that when said primary wheel member rotates, said continuous track member rotates therewith.

13. The combination of claim 8, wherein said front portion secondary wheel member is formed as two spaced wheel members connected to one another via an elongated axle member; and wherein said back portion secondary wheel member is formed as two spaced wheel members connected to one another via an elongated axle member.

14. The combination of claim 8, wherein said two contact skid members and said skid plate member are formed from ultra-high molecular weight polyethylene.

* * * * *